Jan. 20, 1953   L. O. MITCHELL   2,626,337
MEASURING DEVICE
Filed Aug. 24, 1949
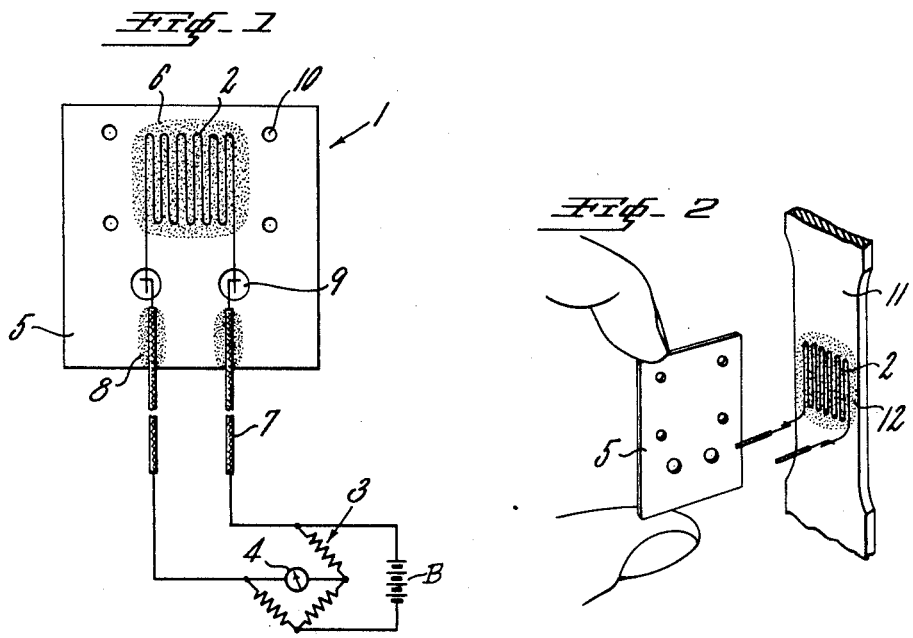
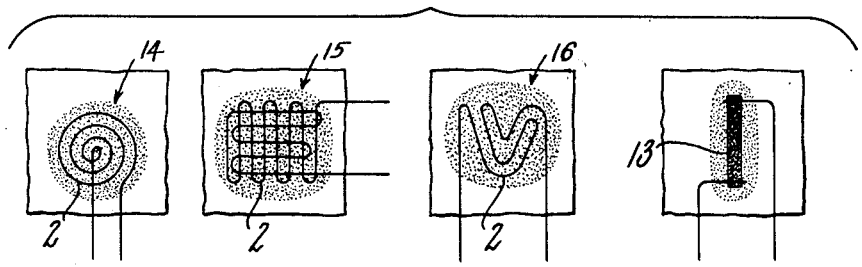
INVENTOR.
LOUIS O. MITCHELL
BY Henry P. Truesdell
ATTORNEY Patented Jan. 20, 1953

2,626,337

UNITED STATES PATENT OFFICE 2,626,337

MEASURING DEVICE

Louis O. Mitchell, Arlington, Mass., assignor to Trans-Sonics, Inc., Bedford, Mass., a corporation of Massachusetts Application August 24, 1949, Serial No. 112,009

7 Claims. (Cl. 201—63)

This invention relates to a measuring device of the type which employs an electrical resistance element, the element being so located that it is responsive to changes in the strain, temperature or other characteristics of a body being measured. More particularly the invention relates to a measuring device having an electrical resistance element and to a method whereby the element may be quickly and easily transferred to any body or surface of which the characteristics are to be measured. In the operation of such resistance elements, any change in the characteristics of the body being measured is translated into a change in the electrical characteristics of the resistance element which, in turn, operates an electrical circuit to give an indication of the direction and magnitude of the body change.

An object of the invention is to provide a new and improved measuring device having an electrical resistance element which is so constructed that the element may be transferred and bonded to the body whose characteristics are being measured without disturbing the accuracy or electrical properties of the element itself.

Another object is the provision of a measuring device having an electrical resistance element which is of simple construction such that it may be manufactured at low cost, which is compact in arrangement, and which is extremely sensitive and accurate in use yet rugged enough to be handled and installed under the conditions found in field testing installations.

Still another object is the provision of a measuring device employing an electrical resistance element bonded to a supporting member the surface of the member being treated so that the bonding substance with the resistance element imbedded therein may be transferred to the body of the member being tested without change in the physical arrangement of calibration of the element.

A further object is to provide a new and improved method of mounting an electrical resistance element of a measuring device directly on the body whose characteristics are to be measured.

In the accompanying drawing:

Fig. 1 illustrates one form of measuring device constructed in accordance with the invention together with a conventional electrical indicating circuit;

Fig. 2 illustrates the manner in which the electrical resistance element of the measuring device is applied to the specimen or body being tested; and Fig. 3 illustrates various forms which the electrical resistance element may take.

Referring to the drawing, Fig. 1 illustrates a measuring device 1 constructed in accordance with the present invention and which includes an electrical resistance element, in this case a wire filament 2. The resistance wire may be electrically connected into a Wheatstone bridge circuit 3, provided with an indicator 4, which gives an indication of the variations in electrical resistance of the wire filament 2 during use of the measuring device. A battery B energizes the circuit. The electrical indicating circuit to which the measuring device 1 is connected forms no part of the instant invention and may comprise the conventional Wheatstone bridge circuit as shown, or, the electrical output of the measuring device may be fed to an electronic amplifying circuit provided with conventional recording or indicating means such as an oscilloscope.

In using the measuring device, variations in the electrical characteristics of the resistance element 2 are made use of to give an indication of variations or changes in the characteristics of the body being measured. For example, if the measuring device is to be used to determine the temperature of a body then the filament 2 will be constructed of a wire the resistance of which will vary in accordance with the temperature changes to be measured. Again, if the measuring device is to be used to measure the strain in a structural member the filament would be constructed of a wire whose electrical resistance would vary as the wire is stretched or contracted as it follows the strain occurring in the structural member to which it is attached.

Measuring devices utilizing electrical resistance elements have heretofore been constructed with the resistance element wound around, or permanently cemented to one side of, a supporting member, usually a piece of fiber board, and the measuring device thus constructed is applied to, or located adjacent to, the body of which the characteristics are to be measured. Under certain testing conditions, for example in determining the wing stresses in an airplane, or the temperatures in a turbo-jet engine, it may be difficult to apply the measuring devices heretofore constructed in the proper location for test purposes; either the member under test may be of such shape that the mounted resistance element cannot be applied thereto or the support for the resistance element might be damaged or consumed during high temperature tests. Moreover, it is difficult, if not impossible, in the field, to apply or wind an electrical resistance element directly on a body being tested because the electrical characteristics of the resistance element will vary, whereas for accurate testing the characteristics must be known and predetermined since the electrical measuring equipment is used in conjunction with a large number of installations requiring a high degree of uniformity between each electrical measuring unit. The instant invention makes it possible to construct the electrical resistance element under controlled conditions at the factory and then to apply it directly to the member or body under test in the field so that accurate and reliable data is obtained. To this end, the electrical resistance element is fastened to the supporting member in such a manner that it may be removed therefrom and bonded to the body under test during installation in the field.

The measuring device includes a supporting member 5 which may be constructed of a flat sheet of paper, cardboard, impregnated cloth, plastic, or the like. The surface of the supporting member is treated or coated in such a way that the coating is soluble in a fluid to permit the electrical resistance element which is cemented thereto to be removed in a manner to be presently described. For example, the supporting member may be coated or impregnated with a mixture of nitro cellulose cement and acetone. When this coating has dried a coating of ceramic cement, for example, one consisting of a powdered ceramic such as aluminum oxide mixed with sodium silicate, is applied over a portion of one side of the supporting member and allowed to dry. Thereafter, the wire filament 2 is placed in position on the cemented surface in the form of a grid and secured in position with a second layer of the ceramic cement. Additional coatings of the ceramic cement may be applied if necessary. As so assembled, the electrical resistance element is thoroughly and completely embedded in the cement coating, as indicated at 6. The cement hardens about the electrical resistance element and forms with it a unitary structure. In effect, the cement forms an insulating material in which the resistance element is embedded. It is important that the cement or bonding material in which the resistance element is embedded be insoluble in the fluid which is to be used to dissolve the original coating on the supporting member, so that the cemented resistance element may be removed from the supporting member and applied as a unit to any body or structural member under test.

In order to make an electrical connection with the resistance element a plurality of insulated lead wires 7 are likewise mounted on the supporting member by means of ceramic cement, as indicated at 8. Stripped ends of the wires extend into openings 9 formed in the supporting member 5 at which point they are spot welded or otherwise electrically connected to the extending ends of the resistance wire 2. By providing the openings 9 it is possible to weld the lead wires to the resistance element after these parts have been assembled on the supporting member. This makes possible an accurate and precise winding of the resistance wire 2 without interference from the lead wires. The supporting member may be provided with additional openings 10 for connecting lead wires to the electrical resistance element when other configurations of the resistance element are provided for on the supporting member.

Fig. 2 illustrates the manner in which the electrical resistance element is applied to the body being measured. The body or test specimen 11, the characteristics of which are being measured, is coated with a thin layer 12 of suitable cement, such as the aforementioned ceramic cement, which is permitted to dry. Thereafter a second coat of the cement is applied to the body and the measuring device 1 is then placed against the test specimen so that the electrical resistance element embedded in the ceramic cement is resting against the wet cemented surface of the body. A slight pressure is applied to the supporting member 5 to bond the resistance element, and the body of cement in which it is embedded, firmly to the cement coating which has been applied to the test body. After the bonded joint has dried the surface of the supporting member 5 is soaked with the aforementioned fluid solvent, such as acetone. This dissolves the first coating of nitro cellulose cement on its surface so that the supporting member 5 may be removed, as indicated in Fig. 2. Since the ceramic cement is insoluble in acetone the electrical resistance element is left securely cemented in position on the surface of the test body. Inasmuch as the lead wires 7 are likewise secured to the supporting member by the same bonding cement as secures the electrical resistance element they are likewise released from the supporting member and provide electrical connections to the resistance element.

It should be noted that the electrical resistance element 2 and the coating 6 in which it is embedded are transferred from the supporting member 5 to the test body as a unit. For this reason the arrangement or configuration of the electrical resistance element is not disturbed during the transfer operation so that the calibration of the element remains unchanged. This means that the electrical characteristics imparted to the resistance element as it is mounted on the supporting member 5 during manufacture, are retained intact by the element after having been transferred to the test body. The construction makes it possible to mount the electrical resistance element on a test specimen in close bonded relationship therewith without the necessity of winding and calibrating the electrical resistance element in the field. Moreover, by making the supporting member 5 of sufficiently flexible paper or strip material it is possible to mount the electrical resistance element upon a curved surface, for example, to measure the torsional strain in a shaft. Another advantage of the construction is that the measuring device may be utilized in locations where the temperatures would ordinarily be sufficiently high to damage or consume a supporting member such as the member 5. The ceramic cement supporting the resistance element can withstand high temperatures on the order of 1100 degrees centigrade.

Although the supporting member 5 has been described as coated with a mixture of nitro cellulose cement and acetone and the resistance element embedded in ceramic cement, manifestly other coatings and cements may be used as long as the material in which the resistance element is placed is insoluble in the coating which separates it from the supporting member. Or the supporting member itself may be constructed of material which may be separated from, or dissolved away from, the embedded resistance unit. For example, instead of using ceramic cement to embed the resistance element in position, cement consisting of titanium dioxide plus a silicate, such as ethyl silicate, may be used particularly when a polystyrene resin is used to coat the surface of the supporting member 5; the resin coating itself is soluble in ketone, esters and aromatic hydrocarbons. Such cement has the advantage that it is a good insulator at high temperatures on the order of 1100° C. and is capable of giving an excellent bond to metal surfaces. Alternatively, the supporting member 5 may be constructed of polymethylmethacrylate in sheet form which itself is soluble in toluene, ethyl acetate, or ethylene dichloride so that it may be readily separated from the resistance element. Again, the supporting member may be coated with a wax, or other thermoplastic materials on which the ceramic cement and resistance element are deposited as disclosed and claimed in my copending application Serial No. 286,686 filed May 8, 1952; application of mild heat softens the wax and permits removal of the supporting member.

The electrical resistance element may take various forms depending upon the particular measurement which is to be made. For example, if the strain in a member is to be measured the resistance element may be constructed of a fine metallic wire having a low temperature coefficient of resistance; it may be constructed of .001" diameter "constantan" wire. Other suitable wires may be formed of tungsten, platinum, nickel or nickel alloys. If the device is to be used to measure temperature then a wire having a high coefficient of resistance versus temperature would be used. Platinum wire is suitable for such a use. If desired the resistance wire may be replaced with a conductive coating 13, shown by Fig. 3. Such a conductive, or semi-conductive coating, may comprise a carbon, selenium or germanium coating or it may be a precipitated or vacuum deposited metallic coating whose resistance can be measured. It is applied between layers of the cement or bonding material the same as the resistance wire and the lead wires are extended into electrical contact therewith.

When used to measure strain the resistance wire filament 2 may be wound to different configurations, as shown in Fig. 3, depending upon the direction or directions in which the strain is to be measured. The arrangement illustrated at 14 may be used to measure strains in diaphragms; that at 15 strains imposed substantially at right angles to each other; and that at 16 strains extending at acute angles.

By constructing the measuring device in accordance with the instant invention it is possible to quickly and easily transfer the electrical resistance element as a calibrated unit to the surface of a body the characteristics of which are to be measured.

Having thus described my invention, what I claim and desire to protect by Letters Patent is:

1. The method of applying to a body a measuring device of the type having an electrical resistance element embedded in insulating cement and bonded to a supporting member comprising the steps of coating the body with an insulating cement, placing the measuring device against the body so that the embedded resistance element is in contact with the cement coating, permitting the coating to harden to retain the resistance element in position and then dissolving the bond between the embedded resistance element and the supporting member so that the supporting member may be removed from the located resistance element.

2. A gauge for making electrical measurements comprising a supporting member having a surface which is soluble in a fluid, an electrical resistance element, a substance surrounding said element and serving to bond it to the surface of said member, said substance being insoluble in the fluid which dissolves the surface of the member whereby the supporting member may be removed from said substance and said resistance element when a dissolving fluid is applied to said surface.

3. A gauge for making electrical measurements comprising, in combination, a member having a supporting surface, a coating on said surface which is soluble in a fluid, an electrical resistance filament, and a cement surrounding said resistance filament to bond it to the coating on said surface so that said resistance filament is embedded in said cement with predetermined electrical characteristics, said cement being insoluble in the fluid which dissolves said coating whereby said supporting member may be removed from the embedded resistance filament upon application of a dissolving fluid to said coating.

4. A gauge for making electrical measurements comprising a supporting member having a surface which is soluble in a fluid, an electrical resistance element, a material surrounding said element and serving to bond it to the surface of said member, electrical lead wires connected to said resistance element, said lead wires themselves being bonded to the surface of said member by additional portions of said material, said material being insoluble in the fluid which dissolves the surface of the member whereby the supporting member may be removed from said material when a dissolving fluid is applied to the surface to separate the supporting member from said resistance element and lead wires.

5. A gauge for making electrical measurements comprising, in combination, a supporting member having openings therein and having a flat surface which is soluble in a fluid, an electrical resistance filament, a cement for embedding said resistance filament and bonding it to said surface, electrical lead wires, said lead wires being bonded to the said surface with additional portions of said cement and being electrically connected to said resistance filament in the areas defined by said openings, said cement being insoluble in a fluid which dissolves the surface of said member whereby the supporting member may be removed from said cement when a dissolving fluid is applied to the surface to separate the supporting member from said resistance filament and said lead wires.

6. A high temperature gauge for making electrical measurements comprising, in combination, a supporting member having a surface which is soluble in a fluid, an electrical resistance element, and a ceramic cement capable of withstanding temperatures on the order of 1100° C. and which is insoluble in any fluid which dissolves the surface of the supporting member, said cement surrounding and embedding the resistance element to bond said resistance element to said supporting member.

7. A gauge for measuring electrically the characteristics of a body comprising, in combination, a supporting member having a coating on the surface thereof which is soluble in a fluid, an electrical resistance element, and a cement comprising a mixture of titanium dioxide and a silicate surrounding and embedding the resistance element for bonding said resistance element to said supporting member, said cement being insoluble in a fluid which dissolves the coating on the supporting member whereby the supporting member may be removed from the embedded resistance element.

LOUIS O. MITCHELL

REFERENCES CITED

The following references are of record in the file of this patent:

UNITED STATES PATENTS

| Number | Name | Date |
|---|---|---|
| 2,344,648 | Simmons | Mar. 21, 1944 |
| 2,350,073 | Simmons | May 30, 1944 |
| 2,363,181 | Howland | Nov. 21, 1944 |

FOREIGN PATENTS

| Number | Country | Date |
|---|---|---|
| 438,706 | Great Britain | Nov. 21, 1935 |
| 590,290 | Great Britain | July 14, 1947 |

OTHER REFERENCES

De Forest et al., Technical Notes No. 744 in vol. 741–760 of U. S. Nat. Advisory Comm. for Aeronautics, 38 pages of Description and 11 pages Diagrams (see pages 4, 10 and 32 in particular).